United States Patent [19]

Collins et al.

[11] Patent Number: 5,041,505

[45] Date of Patent: Aug. 20, 1991

[54] NON-CRYSTALLINE ACETAL COPOLYMER ELASTOMERS

[75] Inventors: George L. Collins, Maplewood; William M. Pleban, Stanhope; Milton J. Hayes, Irvington, all of N.J.

[73] Assignee: Hoechst Celanese Corp., Somerville, N.J.

[21] Appl. No.: 406,641

[22] Filed: Sep. 13, 1989

[51] Int. Cl.$^5$ .................. C08G 65/16; C08L 59/02
[52] U.S. Cl. ...................... 525/398; 528/403
[58] Field of Search ............ 528/403; 525/398

[56] References Cited

U.S. PATENT DOCUMENTS

| | | | |
|---|---|---|---|
| 3,393,157 | 7/1968 | Janssen et al. | 528/403 X |
| 3,422,035 | 1/1969 | May et al. | 528/403 X |
| 3,480,590 | 11/1969 | May et al. | 528/403 X |
| 3,595,812 | 7/1971 | Boulton | 528/403 X |
| 3,652,465 | 3/1972 | Takakura | 528/403 X |
| 4,788,258 | 11/1988 | Collins et al. | 525/414 |
| 4,898,925 | 2/1990 | Collins et al. | 528/230 |

OTHER PUBLICATIONS

Chemical Abstracts 106, 138960b (1987).
Chemical Abstracts 105, 227397v (1986).

*Primary Examiner*—Earl Nielsen
*Attorney, Agent, or Firm*—James L. McGinnis

[57] ABSTRACT

Copolymers of 1,3-dioxolane and 1,3-dioxepane in the form of non-crystalline high molecular weight elastomers having low glass transition temperatures (Tg) are disclosed. Such copolymers are formed by polymerizing from about 40 to about 60 mol percent of 1,3-dioxolane and correspondingly from about 60 to about 40 mol percent of 1,3-dioxepane under substantially anhydrous conditions in the presence of a cationic polymerization catalyst, e.g., a strong Bronsted acid such as trifluoromethanesulfonic acid. Blends of such non-crystalline copolymers with crystalline oxymethylene polymers are also disclosed.

18 Claims, No Drawings

NON-CRYSTALLINE ACETAL COPOLYMER ELASTOMERS

BACKGROUND OF THE INVENTION

1. Field of the Invention

This invention relates to novel acetal copolymers and methods for their preparation. More particularly, this invention relates to novel high molecular weight elastomeric copolymers of 1,3-dioxolane and 1,3-dioxepane. These copolymers are noncrystalline, not only at room temperature (about 25° C.) but at temperatures as low as −120° C. and below. They also have low glass transition temperatures (Tg). Hence, they are useful as low temperature elastomers, and can also be used as adhesives for bonding glass and metals. In addition, they can be blended with conventionally prepared crystalline oxymethylene homo-, co- and terpolymers to improve the impact properties of articles made therefrom.

2. Description of the Prior Art

Commonly-assigned U.S. Pat. No. 4,788,258, issued Nov. 29, 1988 to Collins, et al., discloses and claims low Tg trioxane/1,3-dioxolane copolymers which are non-crystalline at room temperature and above (although they can be made to crystallize at temperatures below room temperature). Those copolymers have a dioxolane content greater than 65 mol percent and less than about 75 mol percent and an IV (intrinsic viscosity) of from about 1.00 to about 2.3, as measured by standard viscometric measurements, e.g., in o-chlorophenol or hexafluoroisopropanol.

Terpolymers of trioxane with 1,3-dioxolane and from about 2 to about 20 weight percent of a formal of a monoethylenically unsaturated aliphatic diol having at least 4 carbon atoms in its main chain—the chain containing the ethylenic unsaturation and bearing the diol's hydroxy groups—such as 4,7-dihydro-1,3-dioxepin (2-butene-1,4-diol formal) and the like, which are non-crystalline at room temperature or above are disclosed in commonly-assigned U.S. Pat. No. 4,758,608, issued July 19, 1988 to Collins, et al. These terpolymers contain greater than 65 weight percent and less than about 75 weight percent dioxolane, and have IV's of from about 0.5 to about 1.5 as measured by standard viscosity measurements.

U.S. Pat. No. 3,480,590, issued Nov. 29, 1969 to May, et al. ("May, et al. I") discloses polymerizing cyclic acetals in the presence of a carbonium or carboxonium hexafluoroantimonate catalyst under substantially anhydrous conditions at a temperature between −100° C. and 150° C. The May, et al. I patent's cyclic acetal monomers include trioxane, tetroxane, 1,3-dioxolane, 1,3,5-trioxepane and 1,3-dioxepane, which are said to be homopolymerizable or copolymerizable with each other or with other polymerizable compounds to give polymers useful for compression, injection, and extrusion molding. Example 7 of the May, et al. I patent relates to the homopolymerization of 1,3-dioxepane in the presence of triphenylmethyl hexafluoroantimonate as a catalyst to give a polymer described as a colorless, slightly tacky, rubber solid.

U.S. Pat. No. 3,422,035, issued Jan. 14, 1969 to May, et al. ("May, et al. II"), discloses polymerizing cyclic acetals in the presence of an iodonium, substituted iodonium, nitryl or nitrosyl hexafluoroantimonate catalyst under substantially anhydrous conditions at a temperature between −100° C. and 150° C. The May, et al. II patent's cyclic acetal monomers again include trioxane, tetroxane, 1,3-dioxolane, 1,3,5trioxepane and !,3-dioxepane, which are also said in this patent to be homopolymerizable or copolymerizable with each other or with other polymerizable compounds to give polymers useful for compression, injection, and extrusion molding. Example 4 of the May, et al. II patent describes copolymerizing dioxolane and trioxane using nitrosyl hexafluoroantimonate as a catalyst to give a polymer having a melting point of 51°-52° C.

U.S. Pat. No. 3,652,465 to Takakura, issued Mar. 28, 1972, discloses polymerizing cyclic acetals such as 1,3-dioxolane, 1,3-dioxepane and 1,3,6-trioxolane using a zinc halide-carbon tetrahalide catalyst system to give homopolymers and copolymers. The patentee describes his products as having the polyether structure and being:

in the form of viscous liquid, grease or solid depending on the types of cyclic acetals and comonomers used and the reaction conditions employed;

sentence bridging columns 3 and 4. Example 8 of the Takakura patent relates to the homopolymerization of 1,3-dioxepane using various combinations of zinc halide and carbon tetrahalide to give products referred to as "grease-like polymers".

U.S. Pat. No. 3,393,157 to Janssen, et al., issued July 16, 1968, describes polymerizing cyclic ethers and acetals using sulfur trioxide ($SO_3$) as a polymerization catalyst. The reaction is carried out at a temperature of from about −80° C. to 150° C. for a period sufficient to produce a polymer not composed exclusively of oxymethylene groups. Example 10 of the Janssen, et al. patent is directed to the homopolymerization of 1,3-dioxolane to give an 81% yield of a product having a reduced viscosity of 3.2. The polymer of this example is not further characterized. The Janssen, et al. patent indicates that its polymers may vary in form from low viscosity oils to high molecular weight solids, depending upon the monomeric starting materials, the amount of catalyst used, and the other reaction conditions. Such polymers are said by Janssen, et al. to be useful as plasticizers, lubricants, intermediates in the manufacture of plastics, and as plastics having thermoplastic properties.

SUMMARY OF THE INVENTION

Non-crystalline, high molecular weight elastomeric copolymers of 1,3-dioxolane and 1,3-dioxepane have now been prepared by polymerizing from about 40 to about 60 mol percent of 1,3-dioxolane with, correspondingly, from about 60 to about 40 mol percent of 1,3-dioxepane under anhydrous conditions in the presence of a cationic polymerization catalyst, e.g., a strong Bronsted acid catalyst such as trifluoromethanesulfonic acid.

Articles made from blends of such non-crystalline copolymers with crystalline oxymethylene polymers exhibit improved impact properties.

It is therefore an object of this invention to provide novel acetal copolymers.

It is also an object of this invention to provide novel copolymers of 1,3-dioxolane and 1,3-dioxepane.

A further object of this invention is to provide novel non-crystalline high molecular weight elastomeric copolymers of 1,3-dioxolane and 1,3-dioxepane having low glass transition temperatures.

Another object of this invention is to provide blends of these novel non-crystalline elastomeric copolymers of 1,3dioxolane and 1,3-dioxepane with conventionally prepared crystalline oxymethylene homo-, co- and terpolymers, and articles prepared from such blends having improved impact properties.

Yet another object of this invention is to provide a method of polymerizing 1,3-dioxolane and 1,3-dioxepane under substantially anhydrous conditions using a cationic polymerization catalyst, e.g., a strong Bronsted acid such as trifluoromethanesulfonic acid.

These and other objects, as well as the nature, scope, and utilization of this invention, will become readily apparent to those skilled in the art from the following description and the appended claims.

DETAILED DESCRIPTION OF THE INVENTION

The novel high molecular weight elastomeric copolymers of 1,3-dioxolane and 1,3-dioxepane prepared in accordance with this invention are characterized by the absence of crystallinity at temperatures as low as $-120°$ C. and below. This property has been confirmed by Differential Scanning Calorimetry (DSC), which measures the heat released when a material crystallizes, performed on copolymers prepared in accordance with this invention containing from about 40 to about 60 mol percent of 1,3-dioxolane, and correspondingly from about 60 to about 40 mol percent of 1,3-dioxepane, these percentages being based on the combined molar quantity of 1,3-dioxolane and 1,3-dioxepane. No evidence of crystallinity has been found even when such copolymers are slowly cooled to $-120°$ C. and below in the calorimeter. Preferably, such copolymers will contain from about 45 to about 55 mol percent of 1,3-dioxolane, the remainder being 1,3-dioxepane, and it is particularly preferred that such copolymers contain from about 50 to about 55 mol percent of 1,3-dioxolane, the remainder being 1,3-dioxepane. A most preferred copolymer prepared in accordance with this invention contains about 50 mol percent of 1,3-dioxolane and about 50 mol percent of 1,3-dioxepane.

These copolymers have low glass transition temperatures, ranging from about $-79°$ C. to about $-85°$ C., and are further characterized by high molecular weights, as determined by standard IV measurements carried out using hexafluoroisopropanol or o-chlorophenol as the solvent. Such copolymers will ordinarily exhibit IV's ranging from about 2.50 to about 5.61, with the preferred copolymers having IV's ranging from about 3 to about 5 and the most preferred copolymers having IV's ranging from about 4 to about 5.

Such copolymers can be prepared by copolymerizing a neat solution of the comonomers, i.e., one containing no solvent using a catalytically effective amount of a cationic polymerization catalyst, such as a strong Bronsted acid, e.g., trifluoromethanesulfonic acid, perchloric acid, p-toluenesulfonic acid, or the like, or a Lewis acid, e.g., p-nitrobenzenediazoniumfluoborate, boron trifluoride, phosphorous pentafluoride, or the like, preferably a low catalyst concentration ranging from about $1 \times 10^{-5}$ M/L to about $1 \times 10^{-3}$ M/L, such as $5 \times 1^{-5}$ M/L, based on the volume of comonomers, which will facilitate the production of relatively high molecular weight copolymers.

Polymerization temperature and pressure are not critical. Thus, the monomers can be copolymerized at room temperature or above and at atmospheric pressure or above for from about 20 to about 30 hours. Room temperature polymerization at atmospheric pressure for about 24 hours is preferred.

The polymerization reaction should, however, be carried out under substantially anhydrous conditions. Preferably, less than 10 ppm of water should be present, since the presence of more than trace amounts of water will cause chain transfer reactions to occur, resulting in suppression or degradation of molecular weight buildup. It has been found that the necessary dry conditions can be achieved by distilling the 1,3-dioxolane and 1,3-dioxepane monomers from sodium/potassium alloy and using material transfer techniques that minimize exposure to air.

Crystalline oxymethylene polymers useful in preparing the blends of this invention are well known in the art. Such polymers are characterized in general as having recurring oxymethylene groups or units. The term oxymethylene polymer as used herein is intended to include any oxymethylene polymer having oxymethylene groups which comprise at least about 50 percent, and generally at least about 85 percent, of the polymer's recurring units, i.e., homopolymers, copolymers, terpolymers, and the like.

Typically, oxymethylene homopolymers, or polyformaldehydes or [poly(oxymethylenes)], are prepared by polymerizing anhydrous formaldehyde or trioxane. For example, high molecular weight polyoxymethylenes have been prepared by polymerizing trioxane in the presence of certain fluoride catalysts, such as antimony fluoride. Polyoxymethylenes may also be prepared in high yields and at rapid reaction rates by the use of catalysts comprising boron fluoride coordination complexes with organic compounds, as described in U.S. Pat. No. 2,898,506 to Hudgin, et al.

Oxymethylene homopolymers are usually stabilized against thermal degradation by end-capping with, for example, ester or ether groups such as those derived from alkanoic anhydrides, e.g., acetic anhydride, or dialkyl ethers, e.g., dimethyl ether, or by incorporating stabilizer compounds into the homopolymer, as described in U.S. Pat. No. 3,133,896 to Dolce et al.

Oxymethylene copolymers which are especially suitable for use in the blends of this invention will usually possess a relatively high level of polymer crystallinity, i.e., about 70 to 80 percent or higher. These preferred oxymethylene copolymers have repeated units which consist essentially of oxymethylene groups interspersed with oxy(higher)alkylene groups represented by the general formula:

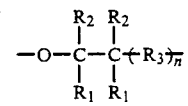

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive. Each lower alkyl group preferably contains one or two carbon atoms.

Oxymethylene groups generally will constitute from about 85 to about 99.9 percent of the recurring units in such copolymers. The oxy(higher)alkylene groups incorporated into the copolymer during copolymerization produce the copolymer by the opening of the ring of a cyclic ether or cyclic formal having at least two adjacent carbon atoms, i.e., by the breaking of an oxygen-to-carbon linkage.

Copolymers of the desired structure may be prepared by polymerizing trioxane together with from about 0.1 to about 15 mol percent of cyclic ether or cyclic formal having at least two adjacent carbon atoms, preferably in the presence of a catalyst such as a Lewis acid (e.g., $BF_3$, $PF_5$, and the like) or other acids (e.g., $HClO_4$, 1% $H_2SO_4$, and the like), ion pair catalysts, etc.

In general, the cyclic ethers and cyclic formals employed in making these preferred oxymethylene copolymers are those represented by the general formula:

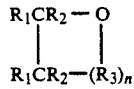

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive. Each lower alkyl group preferably contains one or two carbon atoms.

The cyclic ether and cyclic formal preferred for use in preparing these preferred oxymethylene copolymers are ethylene oxide and 1,3-dioxolane, respectively. Among the other cyclic ethers and cyclic formals that may be employed are 1,3-dioxane, trimethylene oxide, 1,2-propylene oxide, 1,2-butylene oxide, 1,3butylene oxide, 1,4-butanediol formal, and the like.

Oxymethylene copolymers produced from the preferred cyclic ethers have a structure composed substantially of oxymethylene and other oxy(lower)alkylene, preferably oxyethylene, groups, and are thermoplastic materials having a melting point of at least 150° C. They normally are millable or processable at temperatures ranging from 180° C. to about 200° C., and have a number average molecular weight of at least 10,000 and weight percent solution in p-chlorophenol containing 2 weight percent of α-pinene).

These oxymethylene copolymers preferably are stabilized to a substantial degree prior to incorporating them into the blends of this invention. This can be accomplished by degradation of unstable molecular ends of the polymer chains to a point where a relatively stable carbon-to-carbon linkage exists at each end of each chain. Such degradation may be effected by hydrolysis, as disclosed, for example, in U.S. Pat. No. 3,219,623 to Berardinelli.

The oxymethylene copolymer may also be stabilized by end-capping, again using techniques well known to those skilled in the art. End-capping is preferably accomplished by acetylation with acetic anhydride in the presence of sodium acetate catalyst.

A particularly preferred class of oxymethylene copolymers is commercially available from Hoechst Celanese Corporation under the designation CELCON ® acetal copolymer, and especially preferred are CELCON ® M25 acetal copolymer, which has a melt index of about 2.5g/10 min. when tested in accordance with ASTM D1238-82, and CELCON ® M90 acetal copolymer.

Oxymethylene terpolymers having oxymethylene groups, oxy(higher)alkylene groups such as those corresponding to the above-recited general formula:

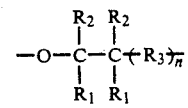

and a different, third group interpolymerizable with oxymethylene and oxy(higher)alkylene groups may be prepared, for example, by reacting trioxane, a cyclic ether or cyclic acetal and, as the third monomer, a bifunctional compound such as a diglycide of the formula:

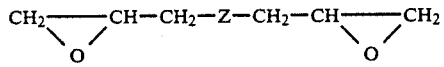

wherein Z represents a carbon-to-carbon bond, an oxygen atom, an oxyalkoxy group of 1 to 8 carbon atoms, inclusive, preferably 2 to 4 carbon atoms, an oxycycloalkoxy group of 4 to 8 carbon atoms, inclusive or an oxypoly(lower alkoxy) group, preferably one having from 2 to 4 recurring lower alkoxy groups each with 1 to 2 carbon atoms, for example, ethylene diglycide, diglycidyl ether and diethers of 2 mols of glycide and 1 mol of formaldehyde, dioxane or trioxane, or diethers of 2 mols of glycide and 1 mol of an aliphatic diol with 2 to 8 carbon atoms, preferably 2 to 4 carbon atoms, or 1 mol of a cycloaliphatic diol with 4 to 8 carbon atoms.

Examples of suitable bifunctional compounds include the diglycidyl ethers of ethylene glycol; 1,4-butanediol; 1,3-butanediol; cyclobutane-1,3-diol; 1,2-propanediol; cyclohexane-1,4-diol and 2,2,4,4-tetramethylcyclobutane-1,3-diol, with butanediol diglycidyl ethers being most preferred.

Generally, when preparing such terpolymers, ratios of from 99.89 to 89.0 weight percent trioxane, 0.1 to 10 weight percent of the cyclic ether or cyclic acetal and 0.01 to 1 weight percent of the bifunctional compound are preferred, these percentages being based on the total weight of monomers used in forming the terpolymer. Ratios of from 99.85 to 89.5 weight percent of trioxane, 0.1 to 10 weight percent of cyclic ether or cyclic acetal and 0.05 to 0.5 weight percent of diglycidyl ether are particularly preferred, these percentages again being based on the total weight of monomers used in forming the terpolymer.

Terpolymer polymerization may be carried out according to known methods of solid, solution or suspension polymerization. As solvents or suspending agents, one may use inert aliphatic or aromatic hydrocarbons, halogenated hydrocarbons or ethers.

Trioxane-based terpolymer polymerization is advantageously carried out at temperatures at which trioxane does not crystallize out, that is, at temperatures within the range of from about −50° C. to about 100° C.

Cationic polymerization catalysts, such as organic or inorganic acids, acid halides and, preferably, Lewis acids, can be used in preparing the terpolymers. Of the latter, boron fluoride and its complex compounds, for example, etherates of boron fluoride, are advantageously used. Diazonium fluoroborates are particularly advantageous.

Catalyst concentration may be varied within wide limits, depending on the nature of the catalyst and the intended molecular weight of the terpolymer. Thus, catalyst concentration may range from about 0.0001 to about 1 weight percent, and preferably will range from about 0.001 to about 0.1 weight percent, based on the total weight of the monomer mixture.

Since catalysts tend to decompose the terpolymer, the catalyst is advantageously neutralized immediately after polymerization using, for example, ammonia or methanolic or acetonic amine solutions.

Unstable terminal hemiacetal groups may be removed from the terpolymers in the same manner as they are from other oxymethylene polymers. Advantageously, the terpolymer is suspended in aqueous ammonia at temperatures within the range of from about 100° C. to about 200° C., if desired in the presence of a swelling agent such as methanol or n-propanol. Alternatively, the terpolymer is dissolved in an alkaline medium at temperatures above 100° C. and subsequently reprecipitated. Suitable alkaline media include benzyl alcohol, ethylene glycol monoethyl ether, or a mixture of 60 weight percent methanol and 40 weight percent water, containing ammonia or an aliphatic amine.

The terpolymers may also be thermally stabilized by degrading unstable molecular ends of their chains to a point where a relatively stable carbon-to-carbon linkage exists at each end of each chain. Thermal stabilization will preferably be carried out in the absence of a solvent in the melt, in the presence of a thermal stabilizer.

Alternatively, the terpolymer can be subjected to heterogeneous hydrolysis wherein water, with or without a catalyst, e.g., an aliphatic or aromatic amine, is added to a melt of the terpolymer in an amount ranging from about 1 to about 50 percent by weight, based on the weight of the terpolymer. The resulting mixture is maintained at a temperature in the range of from about 170° C. to 250° for a specified period of time, and then washed with water and dried or centrifuged.

A preferred oxymethylene terpolymer is commercially available from Hoechst Celanese Corporation under the designation CELCON® U10 acetal polymer, and is a butanediol diglycidyl ether/ethylene oxide/trioxane terpolymer containing about 0.05 weight percent, 2.0 weight percent, and 97.95 weight percent of repeating units derived from these termonomers, respectively, based on the total weight of these termonomers.

Crystalline oxymethylene polymers admixed with plasticizers, formaldehyde scavengers, mold lubricants, antioxidants, fillers, colorants, reinforcing agents, light stabilizers and other stabilizers, pigments, and the like, can be used in the blends of this invention so long as such additives do not materially affect such blends' desired properties, particularly enhancement of impact strength, as manifested in articles molded therefrom. Such additives can be admixed with the novel non-crystalline 1,3-dioxolane/1,3-dioxepane copolymer, the crystalline oxymethylene polymer or the blend of these two materials using conventional mixing techniques.

Suitable formaldehyde scavengers include cyanoguanidine, melamine and melamine derivatives, such as lower alkyl- and amine-substituted triazines, or amidines, polyamides, ureas, metal oxides and hydroxides, such as calcium hydroxide, magnesium hydroxide, and the like, salts of carboxylic acids, and the like. Cyanoguanidine is the preferred formaldehyde scavenger. Suitable mold lubricants include alkylene bisstearamides, long chain amides, waxes, oils, and polyether glycides. A preferred mold lubricant is commercially available from Glycol Chemical, Inc. under the designation Acrawax C, and is an alkylene bisstearamide. The preferred antioxidants are hindered bisphenols.

Especially preferred is 1,6-hexamethylene bis-(3,5-di-t-butyl-hydroxyhydrocinnamate), commercially available from Ciba-Geigy Corp. under the designation Irganox 259.

A most preferred oxymethylene copolymer for use in the blends of this invention is commercially available from Hoechst Celanese Corporation under the designation CELCON® M25-04 acetal polymer. This oxymethylene copolymer has a melt index of about 2.5 g/10 min. and contains 0.5 percent by weight Irganox 259, 0.1 percent by weight cyanoguanidine, and 0.2 percent by weight Acrawax C.

A most preferred oxymethylene terpolymer for use in the blends of this invention is commercially available from Hoechst Celanese Corporation under the designation CELCON® U10-11 acetal polymer. This is the previously mentioned CELCON® U-10 acetal terpolymer stabilized by 0.5 percent by weight Irganox 259 and 0.1 percent by weight calcium ricinoleate.

Blends of the non-crystalline copolymer and crystalline oxymethylene homo-, co- or terpolymer prepared in accordance with this invention may be made by any conventional procedure that will result in a substantially uniform blend or admixture of the components. Preferably, dry or melt blending procedures and equipment are used. The non-crystalline copolymer, which can range from a dry, clear solid to a slightly tacky material, can be dry mixed with the crystalline oxymethylene polymer (in the form of pellets, chips, flakes, granules or powder), typically at room temperature, and the resulting mixture melt blended in any conventional type extrusion equipment, which is customarily heated to a temperature of from about 170° C. to about 220° C., and preferably from about 190° C. to about 210° C. The sequence of addition of the components is not critical, and any conventional means may be used to form the substantially uniform admixture.

Preferably, the non-crystalline copolymer and the crystalline oxymethylene polymer are dried (either individually or together) before being subjected to the blending procedure. Drying can be done in desiccated air having a dew point of about −30° C. to −40° C. or lower, at a temperature of from about 70° C. to about 110° C. The drying time will depend primarily on the moisture content, drying temperature, and particular equipment employed, but typically is from about 2 to about 6 hours or more. If drying is conducted for longer periods of time, such as overnight, the drying temperature should preferably be about 70° C. to about 85° C. In general, any conventional drying procedure can be used to reduce the moisture content to below about 0.1 weight percent, based on the total weight of the non-crystalline copolymer and the crystalline oxymethylene polymer, preferably below about 0.05 weight percent, and most preferably below about 0.01 weight percent.

If conventional mold lubricants, plasticizers, fillers (particularly glass in the form of filaments or strands, beads, dust or microbubbles, any of which forms can be sized or otherwise combined with coupling agents), dyes or pigments, nucleating agents, antioxidants, formaldehyde scavengers, chain scission inhibitors, ultraviolet light inhibitors and similar molding additives have not previously been added to the noncrystalline copolymer or the crystalline oxymethylene polymer during the processing of these individual components of the blend, i.e., before they are admixed with each other, they may be added at this time.

The uniform admixture resulting from the blending procedure is then comminuted mechanically, for example by chopping, pelletizing or grinding, into granules, pellets, chips, flakes or powders, and processed in the thermoplastic state, for example by injection molding or extrusion molding into shaped articles, including bars, rods, plates, sheets, films, ribbons, tubes, and the like.

Preferably, the comminuted blend is dried again, in the manner discussed above, prior to being molded.

In order that those skilled in the art can more fully understand this invention, the following examples are set forth. These examples are given solely for purposes of illustration, and should not be considered as expressing limitations unless so set forth in the appended claims. All percentages are by weight, unless otherwise stated.

EXAMPLE 1

1,3-Dioxolane (10 ml) and 10 ml of 1,3-dioxepane, under a nitrogen purge, were injected into a 4 oz. narrow neck jar containing a stirrer. The measured water content of the monomers was 3 µg/1 cc sample. Then, 0.009 ml of a solution of 0.1 ml trifluoromethanesulfonic acid in 10 ml dry nitromethane was added to the monomers. The reaction was carried out for 24 hours at room temperature with a flow of dry nitrogen blanketing the reactor jar. A clear polymer containing some bubbles was formed. At the end of the reaction period, the stirrer could no longer spin and the bubbles were trapped in a clear, rubbery polymer mass.

EXAMPLES 2–7

Copolymers of 1,3-dioxolane and 1,3-dioxepane, and one 1,3-dioxolane homopolymer (Example 2), were prepared as described in Example 1 above under rigorously dry conditions, using the mol percentages of 1,3-dioxolane to 1,3-dioxepane given in Table I below. The recorded glass transition temperatures (Tg) are reported also.

TABLE I

| Example No. | Dioxolane/Dioxepane (%/%) | Tg (°C.) |
| --- | --- | --- |
| 2 | 100/0 | −62 |
| 3 | 80/20 | −69 |
| 4 | 70/30 | −71 |
| 5 | 60/40 | −74 |
| 6 | 60/40 | −74 |
| 7 | 50/50 | −79 |

The table shows that glass transition temperature (Tg) declines as the polymer composition approaches 50/50 mol percent 1,3-dioxolane/1,3-dioxepane. At this composition, Tgs of −79° C. to −84° C. have been measured.

EXAMPLE 8

Blends of 5, 10, 15, 20, 25 and 30%, based on the total weight of the blend, of a 1,3-dioxolane/1,3-dioxepane copolymer, which is prepared as described in Example 1 above, with CELCON ® M25 acetal copolymer, are prepared by mixing the respective materials, in granular form (after drying overnight at 75° C.), at room temperature and then blending the resulting uniform mixtures in an extruder at 190°–210° C.

Improved impact resistant acetal molding resins are obtained.

EXAMPLES 9–13

Blends of 10% and 20%, respectively, of a 1,3-dioxolane/1,3-dioxepane copolymer, prepared as described in Example 1 above, with CELCON ® acetal copolymer (Examples 12 and 13), were prepared as described in Example 8 above. Certain physical properties—tensile strength (KSI), percent elongation, modulus (KSI) and notched Izod impact resistance at 23° C. and −20° C.—of standard test pieces molded from each of these blends of this invention were measured and then compared with those of test pieces molded from:

CELCON ® M90 acetal copolymer itself (Example 9);

TX90, a commercially available CELCON ® M90 acetal copolymer/polyester-based urethane elastomer blend of 90% of the acetal copolymer and 10% of the urethane elastomer (Example 10);

TX90+, a commercially available CELCON ® M90 acetal copolymer/polyester-based urethane elastomer blend of 80% of the acetal copolymer and 20% of the urethane elastomer (Example 11).

The results of this comparison are given in Table II below.

TABLE II

| Material of Example | Tensile Strength (KSI) | Elongation (%) | Modulus (KSI) | Notched Izod At 23° C. | Notched Izod At −20° C. |
| --- | --- | --- | --- | --- | --- |
| 9 | 6.5 | 76 | 315 | 1.3 | 0.90 |
| 10 | 5.3 | 91 | 233 | 1.9 | 0.92 |
| 11 | 7.2 | 468 | 189 | 2.1 | 0.95 |
| 12 | 4.9 | 177 | 223 | 2.0 | 1.7 |
| 13 | 4.1 | 105 | 176 | 2.2 | 1.4 |

The above discussion of this invention is directed primarily to preferred embodiments and practices thereof. It will be readily apparent to those skilled in the art that further changes and modifications in the actual implementation of the concepts described herein can easily be made without departing from the spirit and scope of the invention as defined by the following claims.

We claim:
1. A blend of:
   (A) a high molecular weight elastomeric copolymer of 1,3-dioxolane and 1,3-dioxepane that is non-crystalline at temperatures as low as −120° C. and below, with
   (B) a crystalline oxymethylene polymer.
2. A blend as recited in claim 1 comprising from about 5 to about 30 weight percent of the non-crystalline copolymer and from about 95 to about 70 weight percent of the crystalline oxymethylene polymer.
3. A blend as recited in claim 1 wherein the crystalline oxymethylene polymer is one in which the oxymethylene groups comprise at least 85 percent of the crystalline oxymethylene polymer's recurring units.
4. A blend as recited in claim 3 wherein the crystalline oxymethylene polymer is an end-capped oxymethylene homopolymer.
5. A blend as recited in claim 3 wherein the crystalline oxymethylene polymer is an oxymethylene copolymer having oxymethylene groups interspersed with oxy(higher)alkylene groups represented by the general formula:

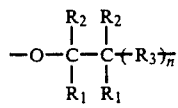

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive.

6. A blend as recited in claim 5 wherein the crystalline oxymethylene polymer is an oxymethylene copolymer consisting essentially of oxymethylene groups interspersed with oxy(higher)alkylene groups represented by said general formula.

7. A blend as recited in claim 6 wherein the crystalline oxymethylene polymer is a copolymer of trioxane and ethylene oxide.

8. A blend as recited in claim 6 wherein the crystalline oxymethylene polymer is a copolymer of trioxane and 1,3-dioxolane.

9. A blend as recited in claim 1 wherein the crystalline oxymethylene polymer is an oxymethylene terpolymer.

10. A blend as recited in claim 9 wherein the terpolymer is one having oxymethylene groups, oxy(higher) alkylene groups represented by the general formula:

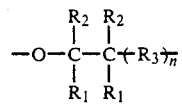

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive, and a different, third group interpolymerizable with oxymethylene and oxy(higher) alkylene groups.

11. A blend as recited in claim 10 wherein the different, third group is derived from a bifunctional monomer.

12. A blend as recited in claim 11 wherein the bifunctional group is derived from a diglycide of the general formula:

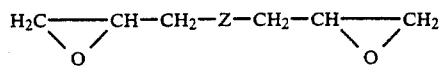

wherein Z represents a carbon-to-carbon bond, an oxygen atom, an oxyalkoxy group of 1 to 8 carbon atoms, inclusive, an oxycycloalkoxy group of 4 to 8 carbon atoms, inclusive, or an oxypoly(lower alkoxy) group having 2 to 4 recurring lower alkoxy groups each with 1 or 2 carbon atoms.

13. A blend as recited in claim 9 wherein the crystalline oxymethylene polymer is a terpolymer of trioxane, ethylene oxide and butanediol diglycidyl ether.

14. A blend as recited in claim 1, said copolymer having an IV of from about 2.50 to about 5.61 and a glass transition temperature of from about $-79°$ C. to about $-85°$ C.

15. A blend as recited in claim 1, said copolymer containing from about 40 to about 60 mol percent of 1,3-dioxolane and from about 60 to about 40 mol percent of 1,3-dioxepane.

16. A blend as recited in claim 1, said copolymer containing from about 45 to about 55 mol percent of 1,3-dioxolane and from about 55 to about 45 mol percent of 1,3-dioxepane.

17. A blend as recited in claim 1, said copolymer containing from about 50 to about 55 mol percent of 1,3-dioxolane and from about 50 to about 45 mol percent of 1,3-dioxepane.

18. A blend as recited in claim 1, said copolymer containing about 50 mol percent of 1,3-dioxolane and about 50 mol percent of 1,3-dioxepane.

* * * * *